US012776828B2

(12) United States Patent
Ciochina et al.

(10) Patent No.: US 12,776,828 B2
(45) Date of Patent: Oct. 27, 2026

(54) METHOD IMPLEMENTED BY USER EQUIPMENT TO ACCESS SATELLITE NETWORK

(71) Applicant: MITSUBISHI ELECTRIC CORPORATION, Tokyo (JP)

(72) Inventors: Cristina Ciochina, Rennes cedex (FR); Nicolas Gresset, Rennes cedex (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 624 days.

(21) Appl. No.: 18/030,040

(22) PCT Filed: Oct. 1, 2021

(86) PCT No.: PCT/JP2021/037260
§ 371 (c)(1),
(2) Date: Apr. 3, 2023

(87) PCT Pub. No.: WO2022/107484
PCT Pub. Date: May 27, 2022

(65) Prior Publication Data

US 2023/0370154 A1 Nov. 16, 2023

(30) Foreign Application Priority Data

Nov. 20, 2020 (EP) .................................... 20306426

(51) Int. Cl.

| | |
|---|---|
| ***H04W 48/18*** | (2009.01) |
| ***H04B 7/185*** | (2006.01) |
| ***H04W 36/00*** | (2009.01) |
| ***H04W 74/08*** | (2024.01) |
| *H04W 74/0833* | (2024.01) |

(52) U.S. Cl.
CPC ..... *H04B 7/18513* (2013.01); *H04W 74/0833* (2013.01)

(58) Field of Classification Search
CPC .............. H04B 7/2041; H04B 7/06952; H04B 7/18513; H04B 7/18539; H04B 7/18517;
(Continued)

(56) References Cited

U.S. PATENT DOCUMENTS 6,381,228 B1 * 4/2002 Prieto, Jr. ............ H04B 7/2123 370/444
6,553,225 B1 * 4/2003 Zhao .................... H04B 7/2041 455/430

(Continued)

FOREIGN PATENT DOCUMENTS

WO WO-2020092566 A1 * 5/2020 ............ H04W 48/18
WO WO 2020/221092 A1 11/2020

OTHER PUBLICATIONS

Japanese Office Action for Japanese Application No. 2023-529440, dated Jan. 16, 2024, with English translation.

(Continued)

*Primary Examiner* — Edan Orgad
*Assistant Examiner* — Vanneilian Lalchinthang
(74) *Attorney, Agent, or Firm* — Birch, Stewart, Kolasch & Birch, LLP

(57) ABSTRACT

A method implemented by a user equipment to access a satellite network, at least one satellite of the satellite network being in movement relatively to Earth, the satellite network deploying radiofrequency satellite beams, wherein the user equipment: receives through at least a first satellite beam data of assistance information regarding at least current and future satellite beams of the network, interprets the data of assistance information to anticipate: connection conditions through the first satellite beam, and connection conditions through at least one second satellite beam, different from the first satellite beam, decides the access to the satellite network through a satellite beam among the first satellite beam and the second satellite beam, selected on the basis of at least (Continued)

the connection conditions through the first and second satellite beams, and implements a RACH procedure through the selected satellite beam.

14 Claims, 5 Drawing Sheets

(58) Field of Classification Search
CPC ... H04W 48/18; H04W 72/542; H04W 16/28; H04W 56/005; H04W 84/06; H04W 88/06; H04W 74/08; H04W 72/1284; H04W 28/0278; H04W 74/0833; H04W 74/00; H04W 88/16; H04W 36/302; H04W 76/45
USPC .......................................................... 370/316
See application file for complete search history.

(56) References Cited

U.S. PATENT DOCUMENTS 8,090,372 B2 * 1/2012 Brunel ................ H04W 36/302
370/347
2003/0045241 A1 * 3/2003 Noerpel ............. H04B 7/18539
455/12.1
2018/0288798 A1 * 10/2018 Damnjanovic ....... H04W 74/00
2020/0313755 A1 * 10/2020 Chuang ................. H04L 5/0048
2020/0314912 A1 * 10/2020 Wang ................. H04B 7/18519
2022/0182913 A1 * 6/2022 Liu ...................... H04B 7/1851

OTHER PUBLICATIONS

International Search Report for PCT/JP2021/037260 (PCT/ISA/210) mailed on Dec. 9, 2021.
Written Opinion of the International Searching Authority for PCT/JP2021/037260 (PCT/ISA/237) mailed on Dec. 9, 2021.
"Research on Handover Algorithms in Satellite Mobile Communication System," Master's Thesis of Chongqing University of Posts and Telecommunications, S130101074, Jun. 8, 2016, 69 pages total, with English translation of the Abstract.
"Research on the key technologies of mobility management in heterogeneous networks," Beijing University of Posts and Telecommunications, 075394, Jan. 10, 2010, 64 pages total, with English translation of the Abstract.
Chinese Office Action and Search Report for Chinese Application No. 202180076599.5, dated May 16, 2026, with English translation.

* cited by examiner

METHOD IMPLEMENTED BY USER EQUIPMENT TO ACCESS SATELLITE NETWORK

TECHNICAL FIELD

The present invention relates to the field of telecommunication using non-terrestrial networks, and more specifically to the access to satellite communication networks.

BACKGROUND ART

Telecommunication systems are characterized by exchanges of signaling, an important amount of said signaling being exchanged between the telecommunication network and user equipment (UE) which wants to access said network. An important issue in telecommunication systems is to ensure the balance of user equipment access to the network. Telecommunication networks can indeed encounter access overloads when too many user equipment (UE) request to access the network simultaneously, resulting in delayed access and/or even an access denial for some user equipment units.

Different solutions have been conducted in the case of terrestrial communication networks in order to manage the radio access network (RAN) overload. Such solutions include the concepts of cell barring, dynamic resource allocation of random access and terrestrial machine type communication (MTC) specific schemes as, for example, the ones detailed in the following publications:

3GPP TR 37.868, RAN Improvements for Machine-Type Communications, v11.0.0, October 2011, Sung-Hyung Lee, So-Yi Jung and Jae-Hyun Kim, Dynamic Resource Allocation of Random Access for MTC Devices, ETRI Journal, Volume 39, Number 4, August 2017.

However, such solutions cannot be addressed to non-terrestrial networks (NTN) like non-geostationary satellite communication networks. Indeed, the large amount of user equipment (UE) trying to access a base station of the satellite network, the long-distance uplinks and downlinks due to the distance between user equipment and satellites leading to poor link budgets as well as the movements of satellites with respect to the Earth surface leading to changing zones of coverage on the Earth surface all lead to a difficult traffic congestion control.

Furthermore, the existing solutions of network access control don't prevent user equipment (UE) from performing a random-access request (RACH) through a target base station and thus from consuming radio resources, even if said target base station is currently or will soon be unavailable. This will result in, either the user equipment (UE) being denied the access (and thus a failed RACH procedure) or a necessity for the user equipment (UE) to perform handovers which are resource consuming.

SUMMARY OF INVENTION

The present invention aims at improving the situation.

It is proposed a method implemented by a user equipment to access a satellite network, at least one satellite of said satellite network being in movement relatively to Earth, said satellite network deploying radiofrequency satellite beams, wherein the user equipment:

\a\ receives through at least a first satellite beam data of assistance information regarding at least current and future satellite beams of the network, \b\ interprets said data of assistance information to anticipate:

connection conditions through said first satellite beam, and connection conditions through at least one second satellite beam, different from said first satellite beam, \c\ decides the access to the satellite network through a satellite beam among the first satellite beam and the second satellite beam, selected on the basis of at least said connection conditions through said first and second satellite beams, and \d\ implements a RACH procedure through the selected satellite beam.

The user equipment is thus provided with relevant information about the satellite network in order to access the satellite network in a way that optimizes both the overall performance of the network and the connection conditions of the user equipment on the long run.

In a satellite network, a radio cell can correspond to a single satellite beam, or to multiple satellite beams. In the latter case, in some implementations, the users on the Earth surface cannot distinguish between different beams forming a cell (e.g. if there is no beam specific pre-compensation, and/or no specific information on the beam index transferred to the UEs on the Earth surface). The current invention thus also refers to a method implemented by a user equipment to access a satellite network, at least one satellite of said satellite network being in movement relatively to Earth, said satellite network deploying radiofrequency satellite cells, wherein the user equipment:

\a\ receives through at least a first satellite cell data of assistance information regarding at least current and future satellite cells of the network, \b\ interprets said data of assistance information to anticipate:

connection conditions through said first satellite cell, and connection conditions through at least one second satellite cell, different from said first satellite cell, \c\ decides the access to the satellite network through a satellite cell among the first satellite cell and the second satellite cell, selected on the basis of at least said connection conditions through said first and second satellite cells, and \d\ implements a RACH procedure through the selected satellite cell.

More generally, all description hereinafter describes with respect to a satellite beam also applies to a satellite cell.

The user equipment can rely on information about the current state of the network but also on the predictable situation of the network in order to anticipate the conditions of access to the network. Indeed, in Low Earth Orbit (LEO) satellite networks with fixed beams, satellites are moving in orbit with respect to the Earth surface and the radiofrequency satellite beams deployed by such satellites are fixed and thus also moving with respect to the Earth surface. Such movements are very rapid in the case of LEO satellite systems, which leads to the mobility of user equipment on the Earth surface being negligible in comparison to the mobility of satellites and their satellite beams. The location of user equipment on the Earth surface is thus considered fixed. Such user equipment aiming at accessing the network by performing a random-access request (RACH) through a satellite beam, has to select such a satellite beam and attempt a RACH request through said beam. In other implementation options, the satellites in the non-geostationary satellite system may have beam steering capacities and be able to point their beams towards fixed points on Earth. The beam footprints will not move with respect to the Earth surface, but the same footprint will be successively served by beams deployed from different satellites with different connection conditions as one satellite moves away in orbit and is replaced by another. The current invention also applies to this case.

Therefore, the invention proposes an assistance information provided to a user equipment which aims at performing a random-access request in order to access the satellite network. Such assistance information transmits information about relevant satellite beams for the user equipment as well as relevant changes within the network such as changes of beam coverage. Such information is predictable and known by all entities of the satellite network (except the user equipment) since the topology of the network as well as the satellite constellation dynamic leading to satellite movements are fixed by the configuration of the network. A given satellite beam thus knows which satellite beam it will replace and which satellite beam will replace it next for a given surface on the Earth, as well as the durations before such changes occur.

By satellite network it is understood a wireless communication network which uses satellites to receive radio signals from the user equipment and/or emit radio signals to the user equipment to perform communication with the user equipment of the communication network.

By current and future satellite beams of the network, it is, respectively understood:

- the satellite beam (or the several satellite beams) whose footprint (or surface zone) on the Earth surface covers the location of the user equipment at the current time, and
- the satellite beams whose footprints on the Earth surface will cover the location of the user equipment next in a later predictable time, that is, the satellite beams which will overlap or replace partly or completely the current satellite beam.

By connection conditions through a satellite beam, it is understood a set of indicators about the connection quality to the satellite network through the channel of a given satellite beam. Said connection conditions can depend on a link budget, an accessibility of the satellite beam (an access capacity, a load or a distance), a level of interference, a signal to noise ratio (SNR), a reference signal received power and/or quality (RSRP/RSRQ) or any other characteristics of a satellite beam. Such characteristics can be measured, computed and/or transmitted to the user equipment at a given time and may change due to satellite constellation dynamic and exchanges of signaling within the network. As a consequence, connection conditions for a given user equipment through each satellite beam of the satellite network can be different throughout time and are (at least partially) predictable by the network.

According to an aspect of the invention, the user equipment determines on the basis of said data of assistance information whether the connection conditions with said second satellite beam will be better, at a time before a duration threshold, than the connection conditions with said first satellite beam, and selects then the second satellite beam to access the satellite network. The second satellite beam may be already visible/measurable by the user equipment and may have worse connection conditions than the first satellite beam at the time of reception of the assistance information. The second beam may be not visible by the user equipment at the time of reception of the assistance information.

As a consequence, the user equipment ought to select the satellite beam through which the connection conditions will be satisfying but also sustainable in order to remain connected to the network through the same satellite beam as long as possible without having to perform handovers, which is radio resource-consuming.

The selection of a satellite beam to access the satellite network is made by the user equipment on a comparison between the connection conditions of different satellite beams on the long run. That is, the invention enables the user equipment to have an anticipated view on the connection conditions through two satellite beams and choose the satellite beam which guarantees a better connection quality, a more sustainable and/or stabilized connection. For example, the user equipment may avoid accessing the network through a first satellite beam with a temporary strong channel quality, but which will soon be replaced by a second satellite beam, whose quality will progressively upgrade and exceed the first one. In some cases, there might be more than two possibilities of connection offered to the user equipment. Therefore, depending on the received assistance information data of a plurality of satellite beams that overlap or will overlap in a predictable time in a zone where the user equipment locates, the user equipment might define a list, possibly with a ranking of preference order between the different satellite beam candidates to be connected to. The ranking can depend on numerous parameters as presented below (future connection conditions, cell loads, total or partial overlap, priorities, etc.). The effective connection can be performed then with one chosen beam being placed at the top of the list.

A duration threshold can be understood as a maximum duration beyond which the comparison of connection conditions between two satellite beams is no longer relevant. Indeed, the user equipment may access the network through a satellite beam whose immediate connection conditions are not optimized but which will improve within a limited duration (that is, before said duration threshold).

According to an aspect of the invention, the user equipment determines whether the connection to the selected satellite beam is to be established after a temporization determined from said data of assistance information and applies said temporization before accessing the satellite network through the selected satellite beam.

As a consequence, a user equipment is provided information to delay its access request to the satellite network if the timing of such an access can be optimized, in terms of connection conditions and/or balance of the network. The application of such a temporization is suggested by the assistance information in case the suggested satellite beam is not available yet (due to an access overload for example), is not reachable by the user equipment yet (the footprint of said beam does not include the location of the user equipment for example) or will encounter changing connection conditions due to an imminent overlap with another satellite beam for example. For many different reasons, the assistance information may inform the user equipment that an access request through said selected satellite beam will be better at a differed time (in terms of connection conditions). The user equipment is thus able to consider applying a temporization to its access in order to avoid failed attempts of access or access with a short life span (and which will require a handover procedure right after for example).

According to an aspect of the invention, the user equipment determines, from said data of assistance information, current and future successive positions of surface zones of said first and second satellite beams, and applies a temporization before accessing the satellite network through the selected satellite beam as long as a current location of the user equipment is outside the surface zone of the selected satellite beam.

As a consequence, the user equipment applies a temporization and waits for the selected satellite beam if said selected satellite beam is not yet reachable, that is, the beam footprint (or surface zone) of said selected satellite beam does not include the location of the user equipment on the Earth surface yet. Such information can be interpreted and/or computed by the user equipment on the basis of assistance information, which provides (directly or not) current and future successive positions of footprints of satellite beams. Such positions belong to the configured data of the network and satellite beams in particular have knowledge of such information to transmit it to the user equipment. Despite having no information about the location of the user equipment, each satellite beam knows which surface zone it currently covers on the Earth surface and which satellite beam will cover said surface zone next, which is an information it can transmit to the user equipment. Satellite beams can also transmit information about current positions, speeds and directions of different satellite beams so that their successive positions can be computed by the user equipment. Thus, the user equipment avoids failed attempts and saves radio resources by waiting for a beam to be accessible, instead of trying to access a yet out-of-reach beam.

According to an aspect of the invention, the user equipment, occupying a current location, is able to obtain data of said current location, and wherein said data of assistance information include at least data of current and future positions of reference points associated to respective satellite beams and distance thresholds data defined for each of the satellite beams, said distance threshold being a maximum allowed distance between a location of a user equipment and a current position of a reference point associated to a satellite beam, and the user equipment:

- determines distances respectively between its current location and the positions of the reference points associated to the satellite beams,
- compares said determined distances respectively to said distance thresholds for each satellite beam,
- and applies a temporization before accessing the satellite network through the selected satellite beam as long as the distance between the current location of the user equipment and the position of the reference point associated to the selected satellite beam exceeds the distance threshold of the selected satellite beam.

As a consequence, the user equipment is able to locate itself with respect to the surface zone of satellite beams and to apply a temporization if its location is considered too far to establish a good connection with said beams.

The user equipment is classically equipped with a GNSS (Global Navigation Satellite System) and is thus able to obtain data of its location on the Earth surface, which is considered fixed with respect to the changing positions of the satellite and their beams.

Reference points associated to a satellite beam can be understood as the center of satellite beam but also any other point belonging to the surface zone of the satellite beam like an equidistant point to some points on the borders delimiting the beam for instance. Distance threshold defined for a satellite beam can be defined by the base stations of the satellite managing said satellite beam. Both reference points and distance thresholds define an access region of a given satellite beam. They are transmitted to the user equipment as assistance information so that it can determine if it is within said access region of the given satellite beam. Such assistance information allows a more flexible management of access compared to cell barring, where user equipment is purely denied the access to a given cell, as configured by the network. In the context of the present description, the user equipment can compute its location with respect to said access region and can apply a temporization in order to wait for said region to include its location before requesting an access. In this context, the assistance information thus enables the user equipment to avoid failed attempts of access and save radio resources as well as accessing the network in optimized connection conditions (which are considered to be met when the distance between the location of the user equipment and the reference point of the beam is below its distance threshold).

A reference point and a distance threshold a priori delimitate an access region as a disk form within the surface zone covered by the satellite beam. In a variant, the access region can have another form than a disk in the case it corresponds to a geographical region like a country, an island, or other. In that case, instead of providing reference points and a distance threshold for a given satellite beam, the assistance information can directly provide the user equipment with an identifier of a region of access, or any other form of identifier (like coordinates, or others). This signaling of an access region enables the user equipment to decide whether or not it belongs to the signaled region and then act accordingly.

According to an aspect of the invention, the data of assistance information include furthermore a temporal information upon which the user equipment determines a duration until when the surface zone of the selected satellite beam will include the current location of the user equipment, and the user equipment applies a temporization corresponding to said determined duration.

That is, the user equipment can rely on the assistance information to quantify the temporization it needs to apply in order to successfully access the selected satellite beam. In case the surface zone of the selected satellite beam does not cover with sufficient link quality the location of the user equipment at the current time but will, in a given duration (which is predictable based on the satellite constellation dynamic), said duration is known and transmitted to the user equipment by a base station through one of its satellite beams. The user equipment can thus apply a temporization during said given duration and then access the selected satellite beam when it is available. Such assistance information enables the user equipment to wait for the right timing to access the network without encountering failed attempts due to a wrong timing of access through a selected satellite beam.

According to an aspect of the invention, the user equipment:

- obtains data related to its current location, and
- if the user equipment determines that its current location is covered by both the respective surface zones of the first and second satellite beams, the user equipment selects, on the basis of respective future connection conditions with said first and second satellite beams, the beam among the first and second satellite beams to access the satellite network.

As a consequence, when the user equipment is in a situation where two satellite beams are simultaneously accessible (that is, the location of the user equipment belongs to the surface zones of two different satellite beams covered with sufficient link quality), it cannot solely rely on the current connection conditions for each satellite beam, since they may be similar. The user equipment will thus select the satellite beam through which it will access the network based on the evolution of said beams within the network. That is, if a first satellite beam is leaving the surface zone including the location of the user equipment while a second satellite beam is in the phase of progressively overlapping said zone, the connection conditions of the first satellite beam will deteriorate while the connection conditions of the second satellite beam will get better. The user equipment, in case of being in the overlapping zone between the two beams at the current time, will take advantage of such future connection conditions provided by the assistance information to select the second satellite beam and remain connected a longer time, without needing to perform resource-consuming handovers.

According to an aspect of the invention, the user equipment stores a data related to a degree of priority to access the satellite network, and the application of said temporization depends on said data of degree of priority.

As a consequence, the access to the network by the user equipment also depends on its own constraints. User equipment stores a degree of priority within a memory unit, which can broadly determine a level of emergency to access the satellite network and exchange data through said network. Thus, the assistance information will suggest potential satellite beams through which it can access the network, some potentially needing a temporization despite having better connection conditions on the long run. A user equipment with a high degree of priority will select a satellite beam through which an immediate access to the satellite network is possible even if said beam does not have the best (present and/or future) connection conditions (for example, the load of the beam is already high), and such choice is possible based on the assistance information. Thus, the selection of a satellite beam is not necessarily based on optimized future connection conditions if the user equipment has a current emergency (such as an earthquake detector, seismic vibrations report etc.). The degree of priority can be relative to the user equipment itself, to a service, or to a data packet.

According to an aspect of the invention, the user equipment, being able to be used for a plurality of types of service, stores data related to degrees of priority to access the satellite network for each of said types of service, and wherein the application of said temporization depends on data related to a degree of priority of a type of service for which the user equipment is currently intended to be used.

As a consequence, the degree of priority can be set by the user equipment per service and an immediate access to the network can be necessary if at least one degree of priority exceeds a threshold set by the user equipment. As an example, a natural catastrophe detector or a meteorite observer can be a service carried by a user equipment with the highest degree of priority.

According to an aspect of the invention, said data of assistance information include information about access capacity levels due to satellite beam loads of the satellite beams, and the user equipment compares access capacity levels of the respective satellite beams, and if the access capacity level of the first satellite beam is below the access capacity level of the second satellite beam, then the user equipment selects the second satellite beam to access the satellite network.

As a consequence, the user equipment is provided assistance information so that it can avoid failed attempts of accessing the network through a satellite beam which already encounters an access overload (that is, when the number of user equipment requesting an access to said satellite beam exceeds the maximum number of access requests that said beam can meet).

According to an aspect of the invention, the user equipment being able to make measurements of channel quality indicators with respective satellite beams before accessing the satellite network, the data of assistance information received by the user equipment include at least channel quality thresholds for each of the satellite beams. The user equipment then compares said measurements to each of said channel quality thresholds so as to identify at least one satellite beam for which the channel quality indicator is above the channel quality threshold, the identified satellite beam being thus a candidate for the selection of satellite beam through which the user equipment accesses the satellite network.

As a consequence, the user equipment can select a satellite beam through which it can access the satellite network based on a comparison of its measurements of said beam with a channel quality threshold, which guarantees the quality of the connection to said cell. Indeed, the user equipment can classically measure various indicators of the channel quality of satellite beams, such indicators being a signal to noise ratio (SNR) or a reference signal received power (RSRP) for example. Such indicators quantify the current connection conditions to the corresponding satellite beam. Such measures made by the user equipment can be compared to channel quality thresholds set by the base stations and transmitted to the user equipment via a satellite beam as an assistance information. Thus, such channel quality thresholds enable the user equipment to avoid failed access attempts by selecting satellite beams for which its channel quality measurements are superior to said channel quality thresholds.

According to an aspect of the invention, the data of assistance information comprise at least one element among a set of elements comprising:

- A level of interference between at least two satellite beams among the satellite beams,
- A noise factor of each of the satellite beams,
- A transmit power of each of the satellite beams.

The user equipment then determines the connection conditions with the satellite beams based on at least one of said elements or on a combination of said elements.

As a consequence, the user equipment is provided with various transmission characteristics and properties of satellite beams in order to evaluate their connection conditions.

According to an aspect of the invention, the user equipment receives said data of assistance information through at least a given satellite beam during or after an initial downlink synchronization between said given satellite beam and the user equipment, before the RACH procedure.

Indeed, while exiting an idle mode to prepare for a connection to the network, the user equipment has to acquire a synchronization with a base station of the network preliminarily to the random-access procedure request (RACH). Said synchronization leads to a downlink synchronization established with said base station, which can broadcast data decodable by the user equipment. In the context of the invention, said base station of the satellite network sends data of assistance information to the user equipment. Said data is transmitted via a satellite beam managed by said base station and is decodable by the user equipment, providing that the surface zone covered by said beam includes the location of the user equipment. The network, and thus the base station and its satellite beam, do not know the locations of user equipment units, have no prior knowledge of the intention of the user equipment units to access the network and may ignore their identity. Therefore, the assistance information should include information relevant specifically to a zone where possible UEs are located and should include data helping the UEs of that zone to connect to the network with optimal conditions. A given satellite beam thus transmits the same assistance information to all user equipment units included in its surface zone.

According to an aspect of the invention, the data of assistance information received by the user equipment through a given satellite beam are relevant to a limited geographical zone on Earth, said limited geographical zone including at least temporarily the surface zone of said given satellite beam. The user equipment thus receives data of assistance information concerning said limited geographical zone only.

An aspect of the invention also comprises a computer program product comprising program instruction code stored on a computer-readable medium for the execution of the method by the user equipment according to precedent claims.

An aspect of the invention furthermore includes a user equipment comprising a processing circuit to perform the method as described in the previous aspects of the invention.

Other features, details and advantages will be shown in the following detailed description and on the figures, not in a limitative way.

DESCRIPTION OF EMBODIMENTS

Figure 1:
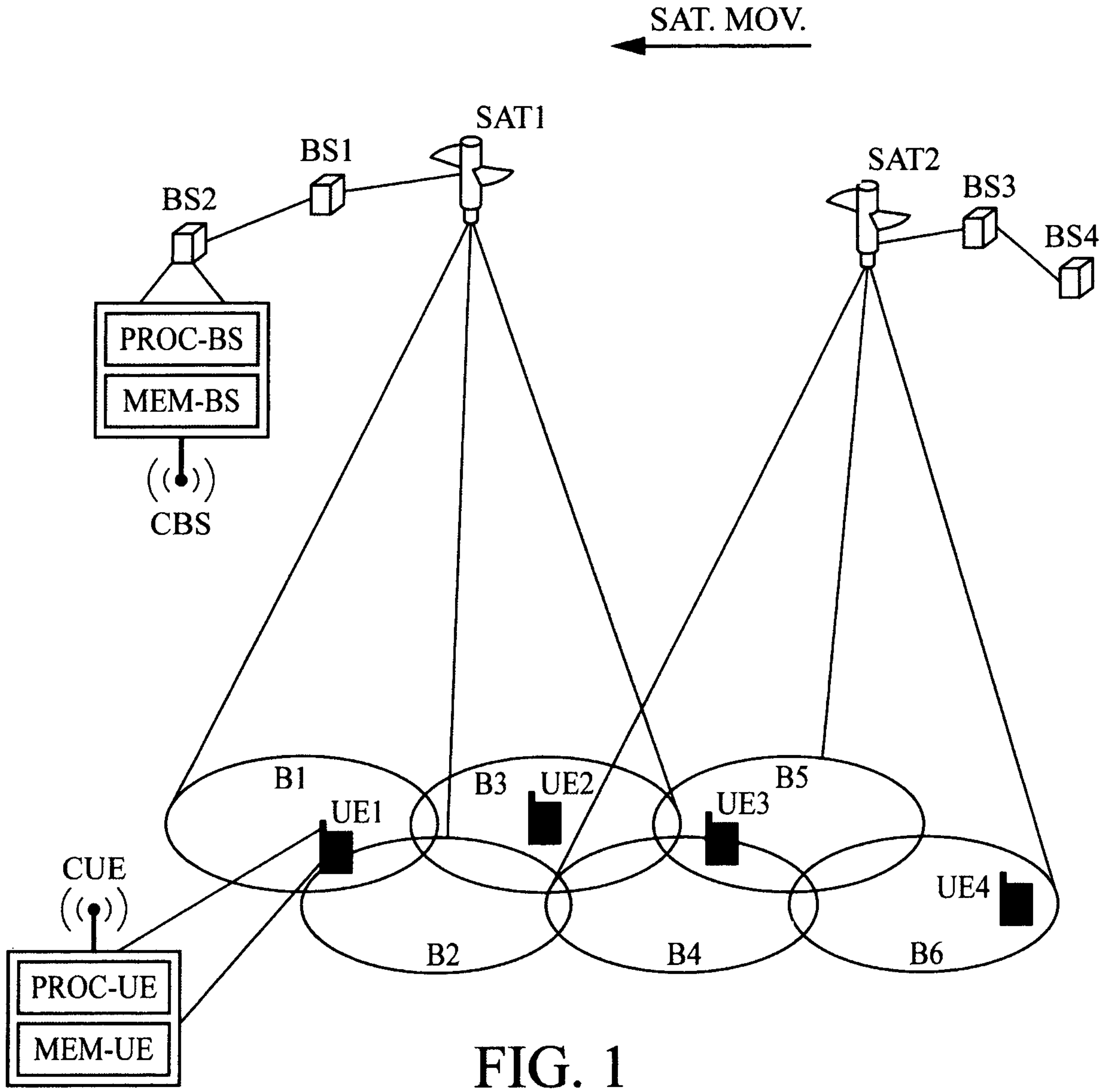
FIG. 1 shows a part of a general satellite communication network where an embodiment of a method according to the invention can be applied.

It is now referred to FIG. 1. There is shown part of a general satellite communication network consisting in one or several satellites (SAT1, SAT2) and one or several user equipment (UE1 to UE4). The present description is not limited to a specific standard, however for the sake of simplicity, the present description will be detailed in the context of the New Radio (NR) standard. The NR standard uses the term user equipment to refer to a device used by an end-user to communicate, however, any other terminologies (for example, a mobile terminal, a mobile station, a personal digital assistant, a wireless modem, a handheld device, etc.) used to refer to any wireless devices used to communicate at least via the satellite network are here encompassed within the term user equipment.

In the case of a Low-Earth Orbit (LEO) deployment, satellites (SAT1, SAT2) have an altitude approximately between 300 and 1500 km with respect to the Earth surface. User equipment (UE1 to UE4) is considered to be at the Earth surface.

Each satellite (SAT1, SAT2) produces one or several satellite beams (B1 to B6). Referring to FIG. 1, the first satellite (SAT 1) produces three satellite beams (B1 to B3) and the second satellite produces three other beams (B4 to B6). Each satellite beam (B1 to B6) is configured in a specific frequency band and through each beam (B1 to B6), the corresponding satellite (that is, the satellite which produces said beam) can transmit and receive data according to radio resources allocated in the frequency band configured for the beam (which can be the same or different between different beams). These radio resources may be shared according to a frequency division scheme (for example, Frequency Division multiplexing (FDM) or Orthogonal frequency-division multiplexing (OFDM)) or by a time division scheme (for example, Time-division multiplexing (TDM)) or code division scheme (code division multiplexing (CDM)), or according to polarization, or a combination thereof.

Each satellite beam (B1 to B6) leaves a beam footprint (also referred to as surface zone) on the Earth surface, said beam footprint corresponding to a specific geographic area on the Earth surface.

The allocation of the radio resources of each beam (B1 to B6) is achieved by base stations (BS1 to BS4). Each base station (BS1 to BS4) manages the radio resources of one or several satellite beams (B1 to B6). For example, referring to FIG. 1:

- the first base station (BS1) manages the radio resources of satellite beams B1 and B2,
- the second base station (BS2) manages the radio resources of satellite beam B3,
- the third base station (BS3) manages the radio resources of satellite beam B4,
- the fourth base station (BS4) manages the radio resources of satellite beams B5 and B6.

Base stations BS1 to BS4 can be physically located within the satellite, or in one or several terrestrial gateways on the Earth surface, or having different functions split between the satellite and some terrestrial gateways.

Each base station (BS1 to BS4) comprises a processing module (PROC-BS), a memory unit (MEM-BS) and a communication interface (cBS). Such communication interface (cBS) can emit and receive information and data to/from both user equipment (UE1 to UE4) and any other network entity. Network entity refers to one among any base station of the satellite network or any other entity of the satellite network other than a user equipment (UE1 to UE4).

Each base station (BS1 to BS4) defines a cell in which user equipment (UE1 to UE4) is allocated the radio resources according to the satellite beams (B1 to B6) managed by said base station (BS1 to BS4). That is, if the location of a user equipment (UE1 to UE4) on the Earth surface belongs to the beam footprint of a given satellite beam (B1 to B6), said user equipment (UE1 to UE4) may be allocated radio resources of said satellite beam (B1 to B6) by the base station (BS1 to BS4) managing this satellite beam (B1 to B6). The user equipment (UE1 to UE4) is thus under the coverage of the cell corresponding to said base station (BS1 to BS4). Therefore, referring to FIG. 1:

- the first base station (BS1) forms a cell C1 covering the user equipment receiving sufficient radio power from the satellite beams B1 and B2, the second base station (BS2) forms a cell C2 covering the user equipment receiving sufficient radio power from the satellite beam B3, the third base station (BS3) forms a cell C3 covering the user equipment receiving sufficient radio power from the satellite beam B4, the fourth base station (BS4) forms a cell C4 covering the user equipment receiving sufficient radio power from the satellite beams B5 and B6.

As a consequence, a cell may correspond to one beam (C2 and C3 for instance) or to several beams (C1 and C4 for instance). A cell (C1 to C4) thus represents a geographic region affected with radio resources on the Earth surface. Cells (C1 to C4) and beam footprints cover a geographic area on the Earth surface and one can define either a beam center when a cell (C1 to C4) corresponds to one satellite beam (B1 to B6), or a cell center when a cell (C1 to C4) corresponds to many satellite beams (B1 to B6).

When a user equipment (UE1 to UE4) is localized within the coverage zone of a given cell (C1 to C4), said user equipment (UE1 to UE4) is technically able to exchange signaling with said cell through a target satellite beam (B1 to B6) managed by said cell (that is, by the corresponding base station), for example by performing a random access procedure request (or RACH) towards said cell through said target satellite beam (B1 to B6), providing that the beam footprint of said satellite beam (B1 to B6) includes the location of the user equipment (UE1 to UE4). This random access procedure (RACH) leads to the user equipment (UE1 to UE4) connecting to said cell (C1 to C4) through said target satellite beam (B1 to B6) and the possibility of uplink (from the user equipment to the satellite network through said target satellite beam and base station) and downlink (from the satellite network through said target satellite beam and base station) transmissions. In particular, the user equipment (UE1 to UE4) is able to transmit data to the satellite network through said target satellite beam (B1 to B6), in the form of data packets which are radiofrequency signals.

The present description relates to the case of user equipment (UE1 to UE4) performing an initial connection request towards the satellite network. That is, the user equipment (UE1 to UE4) is not connected to any satellite cell (C1 to C4) of the satellite communication network at the considered time and exits its idle mode in order to perform its initial random-access request (RACH) to the network. Before performing this access request, the user equipment (UE1 to UE4) listens to broadcasting and paging information accessible from its location on the Earth surface. Indeed, depending on its belonging to one or several coverage zones of one or several cells (C1 to C4), the user equipment (UE1 to UE4) is able to exchange signaling with one or several corresponding base stations (that is, the base stations which manage the cells). In particular, the user equipment (UE1 to UE4) is able to perform a downlink synchronization with said cells (C1 to C4) and receive downlink information from the corresponding base stations (BS1 to BS4) through a satellite beam (B1 to B6) managed by said base stations (BS1 to BS4). Said information is supposed to help the user equipment (UE1 to UE4) target a satellite beam (B1 to B6) among the beams managed by a given cell through which the user equipment (UE1 to UE4) can make an access procedure request and connect to the satellite network.

In this context, the present description proposes an assistance information to the user equipment (UE1 to UE4) provided by a network entity. The assistance information aims at helping the user equipment (UE1 to UE4) anticipate the connection conditions through the different satellite beams of at least one cell (C1 to C4) and select a target satellite beam to perform an access procedure request. Said assistance information can rely for instance on a topology of the satellite communication network, on the predictability of its satellite moving direction and on the different characteristics of each satellite beams of the involved cell. By satellite moving direction, it is understood for example the direction of the movement of the satellite in its orbit, or a projection of this movement on the Earth surface, or any equivalent form of representing the above described direction.

Indeed, in a context of a deployment scenario of low-Earth orbit (LEO) satellites, the present description focuses on a satellite network using non-geostationary orbit satellites. FIG. 1 represents the movement of satellite within the network with an arrow (SAT MOV) showing that satellites (and thus satellites beams and beam footprints) are moving from a right side of the figure towards a left side. This scenario thus results in satellite beam's footprints moving relatively to the Earth surface according to a predictable satellite constellation dynamic. Compared to the mobility of satellites, beam footprints and cells with respect to the Earth surface, the mobility of the user equipment is negligible. Moreover, the satellite constellation dynamic (and thus the successive movements and positions of the beam footprints) is predictable since satellites follow a deterministic orbit defined when the satellite network and/or the base stations are configured. The satellite communication network, the base stations and more generally any network entity can thus have knowledge of this satellite constellation dynamic as well as of the network topology and the characteristics of the satellite beams. Such information can also be acquired by configuration (for instance the operation and maintenance configuration (O&M) and/or inter-base stations exchanges (for example, inter-base station configuration exchanges through Xn links).

As a consequence, the assistance information will provide relevant information taking into account which are the base stations a user equipment should select in order to communicate through the satellite network on the long run. Such assistance information takes the present and future positions of the beam footprints into account and thus the successive changes of coverage a user equipment with a given location on the Earth surface will experience as the satellites and their beams are moving throughout time. In particular, the transmission of relevant assistance information does not require the network (and thus the base station transmitting the data) to localize the user equipment on the Earth surface. Indeed, the assistance information provided by a base station through a given satellite beam is generic to the surface zone of said beam, which includes the location of the user equipment (since the user equipment established a downlink synchronization through said beam). As a consequence, all user equipment belonging to the beam footprint of a given satellite beam managed by a given base station will receive the same content of assistance information from said base station via said beam (providing the fact that the user equipment set a synchronization with said base station).

Said assistance information is thus provided by a network entity (except the user equipment) and can be provided more precisely by a first base station managing the cell covering the location of the user equipment on the Earth surface. The content of the assistance information can be about said first base station (and thus about the satellite beams managed by said base station) and/or about a second base station (and thus about the satellite beams managed by said second base station), said second base station being different from the first base station. Said second base station (and thus the corresponding cell) does not necessarily include the location of the user equipment. That is, said second base station may not be accessible to the user equipment at the time the assistance information is given to the user equipment by the first base station. The first base station can thus provide assistance information about such second base station if the predictable satellite constellation dynamic leads to the satellite beams managed by said second base station being potential target satellite beams for the user equipment to access the network, on the basis of its location on the Earth surface. As a consequence, after establishing a downlink synchronization with a given cell (and thus a corresponding base station), the corresponding base station provides the user equipment with information through a satellite beam about any base station (itself and/or different base stations) considered relevant by the satellite network on the basis of the surface zone covered by said beam and the predictable state of the satellite network.

In case the user equipment acquires several downlink synchronizations with different cells, the user equipment can receive assistance information from each of the different base stations managing each of the different cells.

The content of such assistance information can be complemented with an existing ability of the user equipment to make measurements with one or several satellite beams managed by a considered base station (that is, the user equipment is under the coverage of a cell corresponding to said base station). Such existing measurements, like the signal to noise ratio (SNR) or the reference signal received power (RSRP) are classic indicators of a channel quality between the user equipment and the measured satellite beam. The measure of such channel quality indicators currently helps the user equipment decide which target satellite beam to use to access the satellite network. Yet, as opposed to the assistance information proposed by the present description, such channel quality measurements does not currently offer an anticipated view of the state of the satellite communication network and don't allow the user equipment to select a target satellite beam in prevision of the change of coverage or taking the network overload into account.

The content of such assistance information can also be complemented with the natures of the services carried by the user equipment. Indeed, a user equipment carries at least one service, said service being for example a periodic report about a given Earth zone or a natural disaster detector. Each service has a different degree of priority: some services can be delay-tolerant while others (such as a tsunami or earthquake detector) can be mission-critical. As a consequence, the decision of a user equipment to access an identified target satellite beam can depend on the assistance information but also on the degrees of priority of its services. A user equipment carrying an emergency service for instance, will aim at connecting the satellite communication network as soon as possible, without necessarily looking for an optimization of the network balance or a most sustainable connection.

However, if the user equipment carries services with low degrees of priority (a degree of priority can be considered "low" if it is below a threshold, defined by the satellite network or the user equipment itself), it can decide the access to the satellite network based on an anticipation of the movement of satellites and of the long-term quality channels of different satellite beams. That is, the user equipment can aim at accessing the satellite network through a selected target satellite beam, so that radio resources (for a near future handover for instance) can be saved, the channel quality of such a connection will be maximized or the balance of the satellite network can be ensured for example. Such considerations can be anticipated with the content of the assistance information defined in the context of the present description. In that case, the user equipment may consider doing a temporization before its access procedure request towards its selected target satellite beam, in order to wait for better connection conditions with an accessible satellite beam, to wait for a selected satellite beam to be accessible or available in terms of access capacity or channel quality for instance.

User equipment thus has a need for guidance in order to make its random-access procedure requests more appropriate to a dynamic update of the satellite network topology. The assistance information defined by the present description is useful both for selecting a relevant target satellite beam to access the network and for determining a relevant timing to request such an access in case a temporization is needed and/or possible for the user equipment.

On FIG. 1, several pieces of user equipment (UE1 to UE4) are represented:

- User equipment UE1 is under the coverage of cell C1 managed by base station BS1 and can be allocated radio resources of satellite beams B1 and B2 produced by satellite SAT1,
- User equipment UE2 is under the coverage of cell C2 managed by base station BS2 and can be allocated radio resources of satellite beam B3 produced by satellite SAT1,
- User equipment UE3 is under the coverage of both cells C3 and C4 managed by base stations BS3 and BS4 respectively and can be allocated radio resources of satellites beams B4 (managed by base station BS3) and B5 (managed by base station BS4) produced by satellite SAT2,
- User equipment UE4 is under the coverage of cell C4 managed by base station BS4 and can be allocated radio resources of satellite beam B6 produced by satellite SAT2.

Each user equipment (UE1 to UE4) comprises a computer equipment including a processing module (PROC-UE) and a memory (MEM-UE) as well as a communication interface (cUE). The processing module (PROC-UE) is configured to receive and interpret data from base stations (BS1 to BS4). Through said communication interface (cUE), a user equipment (UE1 to UE4) is able to transmit and receive information to/from one or several base stations (BS1 to BS4), providing that the user equipment (UE1 to UE4) belongs to the coverage zones of the cells (C1 to C4) defined by said base stations (BS1 to BS4).

All four pieces of user equipment (UE1 to UE4) are about to perform an initial access procedure request in order to connect to the satellite communication network. User equipment UE1 has to choose which satellite beam to target among B1 and B2 in order to access cell C1. Assistance information can be useful for UE1 by informing the user equipment UE1 that it will soon leave the beam footprint of satellite beam B1 and should select target satellite beam B2 to access the satellite network. User equipment UE2 will a priori select satellite beam B3 to access the satellite network through cell C2 based for example on its location and/or its own measurements. However, in the context of the present description, the assistance information can inform UE2 that it will soon pass under the coverage of cell C3 due to the predictable satellite constellation dynamic. Assistance information might thus suggest user equipment UE2 to make a temporization and wait to be in the coverage zone of cell C3 and make a random-access procedure request through its satellite beam B4. User equipment UE3 has to choose which satellite beam to target among B4 and B5 in order to access either cell C3 or cell C4. Assistance information might inform the user equipment UE3 that satellite movements will lead to user equipment UE3 being completely under the coverage of cell C4 and thus suggest user equipment UE3 to a priori access the satellite network through cell C4 rather than cell C3. User equipment UE4 will a priori access the satellite network through cell C4.

Figure 2:
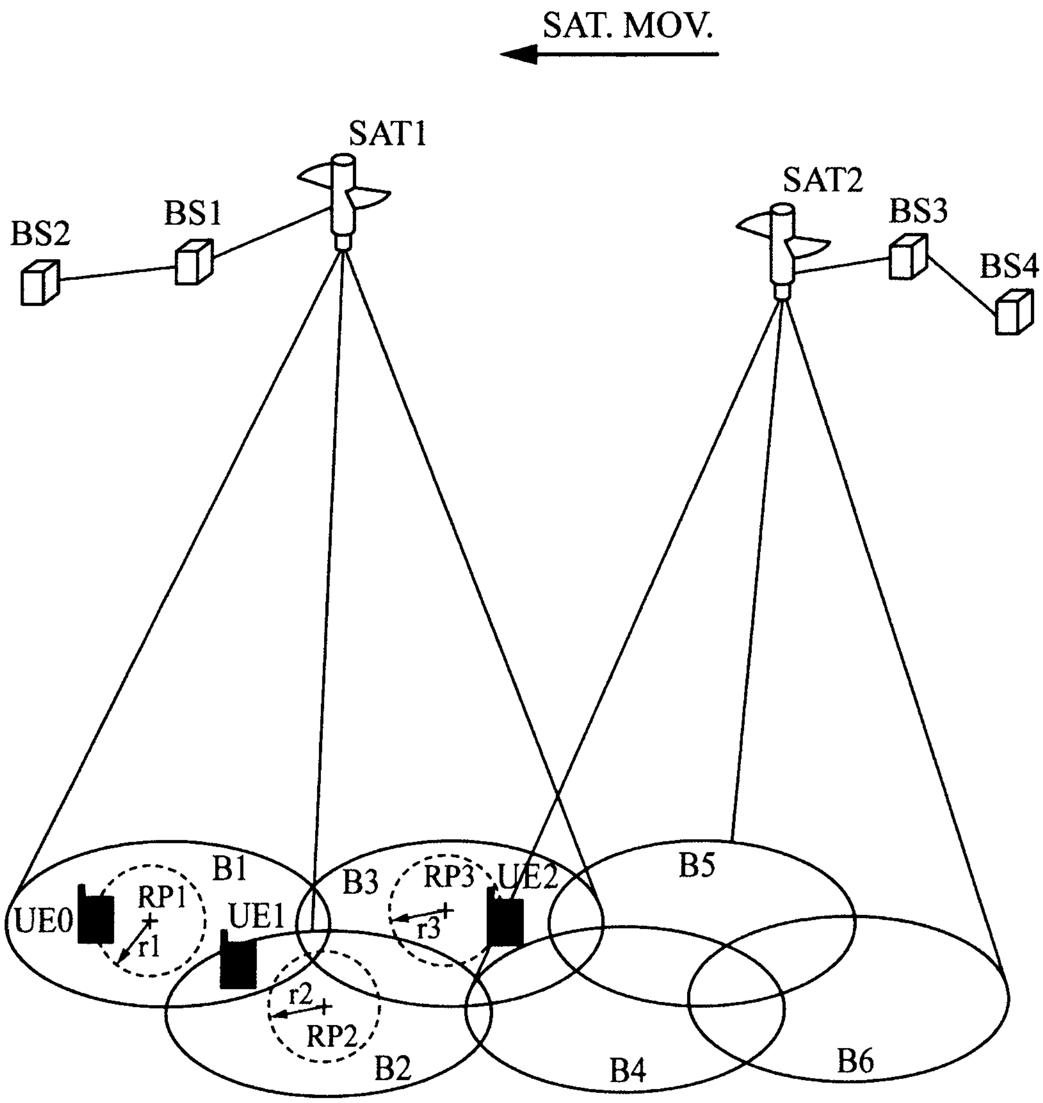
FIG. 2 shows the same part of a general satellite communication network of FIG. 1, where an embodiment of a method according to the invention can be applied.

It is now referred to FIG. 2. FIG. 2 represents the same satellite communication network as the one represented in FIG. 1. FIG. 2 represents only two pieces of user equipment (UE1, also referred to as the first user equipment and UE2 also referred to as the second user equipment) of the user equipment (UE1 to UE4) represented in FIG. 1. A new user equipment (UE0, also referred to as the other user equipment) has also been added on FIG. 2. At a current time, the first user equipment (UE1) is under the coverage of cell C1 defined by the first base station (BS1), said first base station (BS1) managing satellite beams B1 and B2. The first user equipment (UE1) has a location on the Earth surface and said location is considered fixed since the mobility of the user equipment in negligible in comparison to the mobility of the satellites. The fixed location of the first user equipment (UE1) is, at the current time, included in the beam footprints of both satellite beams B1 and B2. The other user equipment (UE0) is also under the coverage of cell C1 and also has a fixed location on the Earth surface which is, at the current time, included in the beam footprint of satellite beam B1. At a current time, the second user equipment (UE2) is under the coverage of cell C2 defined by the second base station (BS2), said second base station (BS2) managing satellite beam B3. The fixed location of the second user equipment (UE2) is, at the current time, included in the beam footprint of satellite beam B3.

The first and other pieces of user equipment (UE0, UE1), aiming at accessing the satellite network through an initial connection, first establish a downlink synchronization with the first base station (BS1) since both user equipment units (UE0, UE1) are under the coverage of cell C1, in order to receive downlink information from said first base station (BS1). In the context of the present description, the first base station (BS1) sends, through downlink messages, assistance information to the first user equipment (UE1) and to the other user equipment (UE0). Said assistance information can be transmitted through satellite beam B1 for the other user equipment (UE0) while it can be transmitted through satellite beams B1 and/or B2 for the first user equipment (UE1). As for the second user equipment (UE2), also aiming at accessing the satellite network through an initial connection, it first establishes a downlink synchronization with the second base station (BS2) since the second user equipment (UE2) is under the coverage of cell C2 in order to receive downlink information from said second base station (BS2) through its satellite beam B3. In the context of the present description, the second base station (BS2) sends, through downlink messages, assistance information to the second user equipment (UE2), said information being generic for satellite beam B3.

In the case of the other user equipment (UE0), assistance information may provide information about satellite beam B1 (through which the information is transmitted) at least and possibly information about satellite beam B2 and/or B3. The predictable satellite constellation dynamic leads to predictable successive positions and movements of the satellite beams B1 and B2 and the assistance information may inform the other user equipment (UE0) that the beam footprint of satellite beam B2 will eventually at least partially overlap the beam footprint of current satellite beam B1. It may also inform the other user equipment (UE0) that the beam footprint of satellite beam B3 will, at a later point but in a predictable time, eventually completely overlap the beam footprint of the current satellite beam B1. Current reference points (RP1, RP2 and/or RP3) of satellites beams B1 and B2 (and/or B3) such as their current respective centers are also communicated to the other user equipment (UE0) as assistance information. Thanks to a global navigation satellite system (GNSS) classically implemented within the computer equipment of the other user equipment (UE0), said other user equipment (UE0) is able to obtain data about its fixed location on the Earth surface, as well as its distance to each of the reference points (RP1, RP2 and/or RP3) of satellite beams B1 and B2 (and/or B3). The computation of such distances by the other user equipment (UE0) allows it to know that it will remain within the beam footprint of satellite beam B1 for a long time before experiencing the beam leap between satellite beams B1 and B2 or B3 (a long time being defined here as a duration worth for a user equipment to make a random access procedure), the distance between its location and the reference point of satellite beam B1 being way below the distance between its location and the reference point of satellite beam B2 for instance. The assistance information also provides the other user equipment (UE0) with characteristics of satellite beams B1 and B2 such as their access capacity, noise factors etc. The other user equipment (UE0) completes such information with its own measurements of channel quality for each of the satellite beams (B1, B2 and/or B3) and finds better connection conditions with satellite beam B1. Both the assistance information and the measurements made by the other user equipment (UE0) suggest satellite beam B1 as the potential target satellite beam. As a consequence, the other user equipment (UE0) selects satellite beam B1 as its target satellite beam and immediately performs an access-request procedure towards said satellite beam B1 in order to access the satellite network, without any temporization.

In the case of the first user equipment (UE1), assistance information may provide information about satellite beams B1 and B2 and/or B3 (and said assistance can be transmitted through beams B1 and/or B2). The predictable satellite constellation dynamic enables the assistance information to inform the first user equipment (UE1) that the surface zone of satellite beam B1 will soon partly pass under the coverage of the beam footprint of the satellite beam B2 in a predictable given time, and/or under the coverage of the satellite beam B3 in a longer but still predictable time. The assistance information also informs the first user equipment (UE1) that satellite beam B1 is rather loaded, because of the other user equipment (UE0) already performing an access procedure through satellite beam B1 for instance. The assistance information can also communicate reference points of satellite beams B1 and B2 and/or B3 such as their respective beam centers (RP1, RP2 and/or RP3). Moreover, the network may provide a ranking or a preference order between different satellite beams (B2 and/or B3) that will overlap in a predictable time the surface zone of satellite beam B1. For example, satellite beam B3 will fully overlap the surface zone of satellite beam B1 and can be assigned a higher preference order than satellite beam B2. The first user equipment (UE1) being equipped with a global navigation satellite system (GNSS), is able to obtain data about its own location of the Earth surface and compute its distance to the reference point of each satellite beam. The assistance information can also communicate a distance threshold (r1, r2 and/or r3) for a given satellite beam, that is, a maximum distance from the reference point of said satellite beam (for example, its beam center) above which the link quality and thus the connection conditions are poor. In the case of the first user equipment (UE1), the assistance information can transmit the distance threshold (r1, r2 and/or r3) for the satellite beams B1 and B2 and/or B3. Based on the data obtained about its own location, the first user equipment (UE1) is able to determine that it is currently too far from the reference point (RP2 and/or RP3) of satellite beam B2 and/or B3 (that is, its distance with respect to the center RP2 and/or RP3 of satellite beam B2 and/or B3 is above the distance threshold r2 and/or r3 of satellite beam B2 and/or B3).

The first user equipment (UE1) also make its own measurements of channel quality for each of the satellite beams (B1, B2) and finds better connection conditions with satellite beam B1 at the current time. B3 is not even yet visible by UE1. Indeed, referring to FIG. 2, the first user equipment (UE1) is "more covered" by the beam footprint of satellite beam B1 than by any other beam footprint among the beam footprints of satellite beams B2 and B3. Yet, the first user equipment (UE1) is aware, based on the assistance information, that such measurements will change in a predictable given time due to an imminent beam leap between satellite beams B1 and B2 and/or B1 and B3. Considering the content of the assistance information, the first user equipment (UE1) may decide to select satellite beam B2 despite better instantaneous channel quality measurements with satellite beam B1. In order to access this satellite beam B2 with optimized connection conditions, the first user equipment (UE1) will apply a temporization (said temporization corresponding to the predictable duration before the beam leap, provided by the assistance information for example) and access the satellite network through satellite beam B2 after the beam leap between satellite beams B1 and B2. The first user equipment (UE1) chooses to delay its access, providing that said first user equipment (UE1) does not carry an emergency service and that a temporization is actually possible. Considering the content of the assistance information in the case where, for example, a higher preference order is attached to beam B3 but a longer temporization is required, the first user equipment (UE1) may decide to select satellite beam B3 despite better instantaneous or short-term channel quality measurements with satellite beam B1 and B2 and the fact that beam B3 is not yet visible. In order to access this satellite beam B3 with optimized connection conditions, the first user equipment (UE1) will apply a temporization (said temporization corresponding to the predictable duration before the beam leap between satellite beams B1 and B3, provided by the assistance information for example) and access the satellite network through satellite beam B3 after the beam leap between satellite beams B1 and B3. The first user equipment (UE1) chooses to delay its access, providing that said first user equipment (UE1) does not carry an emergency service and that a temporization is actually possible.

In specific implementations, it is possible that the user equipment is unable to distinguish among different beams of a same cell. In this case, all beams of a same cell may for example provide the same assistance information on the next cell. Reference points can be attached to a cell instead of a beam. Multiple reference points can also be defined within a cell.

In the case of the second user equipment (UE2), assistance information may provide information about satellite beam B3 at least and possibly information about satellite beam B4, managed by a different satellite (SAT2), a different cell (C3) and a thus a different base station (BS3). Said assistance information is transmitted through satellite beam B3. The channel quality measurements that the second user equipment (UE2) is classically able to make will result in better connection conditions with satellite beam B3 since only the beam footprint of satellite beam B3 covers the location of the second user equipment (UE2) at the current time. Yet, the assistance information provided by the second base station (BS2) through satellite beam B3 will inform the second user equipment (UE2) that predictable satellite and satellite beam movements will lead to a change of coverage between cells C2 and C3 in a predictable given time and that said second user equipment (UE2) should wait and access satellite beam B4 after said change of coverage, in order to avoid consuming radio resources on a short-term RACH procedure through satellite beam B3 followed by a handover procedure from satellite beam B3 to satellite beam B4. That is, data of assistance information in the context of the present description enables the second user equipment (UE2) to anticipate a degradation of connection conditions with satellite beam B3 and the possibility of a connection with better future connection conditions through a yet inaccessible satellite beam, that is B4. The second user equipment (UE2) will thus select satellite beam B4 as its target satellite beam for accessing the satellite network. Unlike the case of the first user equipment (UE1), the second user equipment (UE2) has no choice of immediately accessing the satellite network through its selected satellite beam (B4) since it is not in the coverage zone of the corresponding cell (C3) yet. The second user equipment (UE2) will thus, in the context of the present description, apply a temporization and wait for a change of coverage between cells C2 and C3 instead of accessing cell C2, providing that such a temporization is affordable for the second user equipment (UE2) in terms of emergency.

Figure 3:
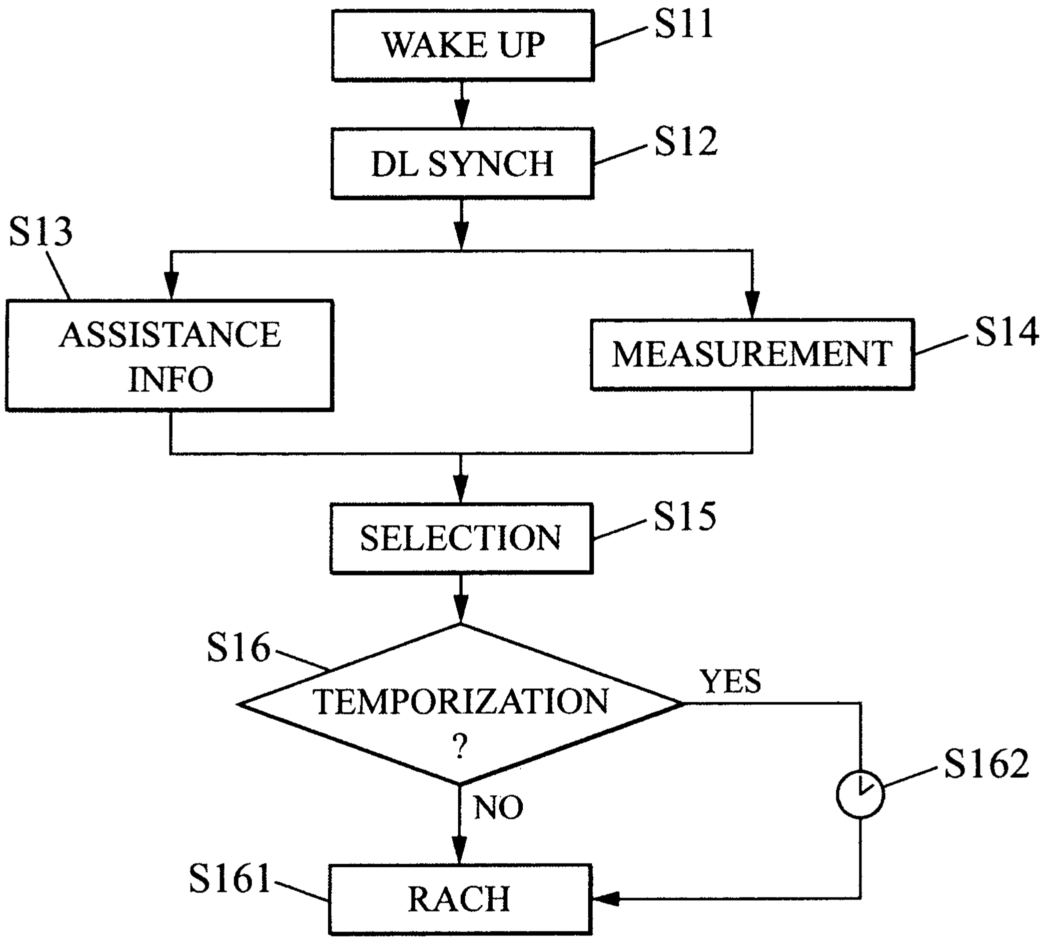
FIG. 3 is a flowchart showing steps of a method implemented by a user equipment according to a possible embodiment of the invention.

It is now referred to FIG. 3. FIG. 3 represents a flowchart of a general method implemented by a user equipment located on the Earth surface in order to perform an initial random-access procedure (RACH) request towards a satellite beam of the satellite communication network, in order to access said satellite network.

At a first step S11, the user equipment exits an idle mode and wakes up in order to prepare for a connection to the satellite communication network. Indeed, before an initial connection, the user equipment experiences long periods of idling where no information is either transmitted or received with any network entity. When aiming at connecting to the satellite network, the user equipment enters a wake-up mode and prepares for its connection by listening to broadcasting and paging information and messages within the satellite network. Such information circulating within the satellite network consists of radiofrequency signals emitted by the different satellites of the network, and more precisely by the base stations of each satellites. User equipment receives such information with more or less channel quality, depending on the location of the user equipment on the Earth surface with respect to the positions of the different beams and cells defined by the base stations, at the time the latter emit broadcasting and paging information. When a user equipment belongs to the coverage zone of a given cell (and thus of one of its satellite beams) on the Earth surface, it is able to receive the radiofrequency signals emitted by the corresponding base station (that is, the base station defining the cell) through the establishment of a downlink (DL) synchronization with said base station at step S12, said signals being transmitted through said satellite beam. This downlink synchronization can be established by the user equipment with a unique base station or with several base stations (if the user equipment belongs to the coverages zones of several different cells corresponding to several different base stations for example). Referring to FIG. 3, it is considered for the simplicity of the description that at step S12, the user equipment establishes a downlink synchronization with one base station defining a cell and a satellite beam on the Earth surface, which covers the location of said user equipment at the current time.

At steps S13 and S14, the user equipment gathers information based on which it will select a target satellite beam in order to access the satellite network. At step S13, the synchronized base station sends data of assistance information via its communication interface to the user equipment as radiofrequency signals emitted throughout the downlink synchronization via said satellite beam. Said data of assistance information aims at helping the user equipment anticipate the connection conditions within the satellite network. In a possible embodiment, said assistance information provides one or several of the following characteristics.

In one embodiment, the assistance information provided at step S13 may include elements which allow the user equipment to identify the potential satellite beams through which it can access the satellite network. Such elements can directly correspond to the identity of said potential satellite beams, but they can also correspond to direction and speeds of beam footprints, satellite location, future positions or successive movements of satellite beams (and thus their beam footprints) on the Earth surface in the surface zone of said the current satellite beam, which includes the location of the user equipment. Indeed, in a low-Earth orbit (LEO) satellite system with fixed satellite beams, satellites, beams and thus beam footprints move regularly in a predictable way. The elements transmitted in the assistance information can thus correspond to information about this satellite constellation dynamic so that the user equipment may deduce or compute the identity of the satellite beams whose footprints are or will, in a limited amount of time, cover its current location on the Earth surface. Said limited amount of time can be for instance a maximum duration within which the user equipment will proceed to a random-access procedure request.

In one embodiment, the assistance information provided at step S13 may include a time stamp of a future potential change of coverage between two cells or a change of satellite beam footprints involving the satellite beam currently covering the fixed location of the user equipment of the Earth surface (the assistance information being transmitted via said satellite beam at least). Indeed, for a given location of the user equipment on the Earth surface, two non-exclusive situations can be considered.

Due to satellite and beam movements, a user equipment under the coverage of a given first cell can experience a change of coverage when said first cell moves away and a second cell, different from the first cell, overlaps the zone previously covered by the first cell. It if for example the case of user equipment UE2 on FIG. 2 with the change of coverage between cells C2 and C3. Such a change of coverage makes sense since the mobility of user equipment is negligible in comparison to the mobility of satellites. As this change of coverage occurs, the user equipment will successively be under the coverage of the first cell (before the change of coverage), of both first and second cells (during the overlapping phase) and eventually of the second cell (when first cell moves away and second cell entirely covers the surface zone including the location of the user equipment). If such a change of coverage is to occur within a limited amount of time, it is a priori better for the user equipment to apply a temporization and wait for the change of coverage to access the satellite network through one of the satellite beams of second cell.

In another situation, due to satellite and beam movements, a user equipment can remain under the coverage of the same cell (the first cell for instance) but experience a change of communication conditions due to the mobility of beams footprints, also called a "beam leap", such beams belonging to the same cell. Indeed, if a first beam footprint which includes the location of the user equipment moves away and is replaced by a second beam footprint (that is, both beam footprints come from different satellites beams of the same first cell), the user equipment, despite an unchanging coverage by the first cell, will experience a radical change in its the communication conditions with said beams: pre-compensation values such as Doppler, timing advance, channel quality measurements or any other beam-specific value transmitted by the satellite beams or measured by the user equipment are to be different. It is for example the case of user equipment UE1 on FIG. 2, with the beam leap between satellite beams B1 and B2 within the same cell C1. The assistance information may thus help the user equipment know in how long such a major change will occur. Based on this knowledge, the user equipment can estimate whether the communication conditions after the beam leap will become more favorable and at which time. Thus, it can decide to perform access to the network before or after the beam leap. For example, referring to FIG. 2, user equipment UE0 better accesses the network through satellite beam B1 before the beam leap, while user equipment UE1 better applies a temporization and waits to access the network through satellite beam B2 after the beam leap.

In one embodiment the assistance information provided at step S13 may also include several characteristics of the target satellite beams and the corresponding base stations, cells and satellites. Such characteristics can be punctual characteristics like an access capacity of a given satellite beam (or a cell load of a given cell), a level of interference for a given satellite beam (caused by signaling exchanged with other network entities or with user equipment). Such characteristics can also be transmission characteristics such as a transmit power or a noise factor. Indeed, two cells can be deployed by a same satellite or by different satellites with different hardware characteristics. Even when two cells are deployed by a same satellite, transmission characteristics can be different, since the cells can be deployed from different antenna panels or different radiofrequency chains with different applied transmission power or pre-compensations. Different satellite beams having different distances between the corresponding satellites and their reference points (such as their respective centers)—can use different transmit powers in order to ensure equivalent power distribution in the corresponding cells on the Earth surface. Different hardware equipment can have different noise factors and thus the distribution of channel quality indicators, like a signal to noise ratio, may differ in different satellite beams even for a same radiated power. Assistance information including such characteristics can help the user equipment estimate its link budget with a given satellite beam or cell and anticipate the different connection conditions with different satellite beams in terms of radio resources to be used.

In one embodiment the assistance information provided at step S13 may also include the position of different reference points associated with one or several satellite beams or cells. Such reference points can be for instance the position of the center of potential target satellite beams or the center of cells currently covering/about to cover the location of the user equipment. Such reference points also come as assistance information computed on the basis of the satellite constellation dynamic. Such assistance information about centers of satellite beams are particularly relevant combined with assistance information including distance thresholds for each beam. That is, apart from the zone delimited on the Earth surface by a satellite beam footprint, which is an unchangeable zone belonging to the topology of the satellite network (and related to the size of the beam footprint), a satellite beam can have a zone delimited around its center and the distance between the borders of this defined zone and said center of the satellite beam (a radius for instance) defining the distance threshold of said satellite beam. Each base station can thus define a distance threshold for each of its satellite beams, said distance threshold being potentially variant throughout time and discussed through inter-base stations interactions. Said distance threshold aims at defining a zone of possible access to the corresponding satellite beam, possibly for guaranteeing a minimum channel quality when accessing said satellite beam. By definition, said zone defined by a distance threshold is included in the beam footprint for a given satellite beam since an access to a given satellite beam by a user equipment requires this user equipment to be in the coverage zone of said satellite beam (while the strict inclusion of a user equipment in the coverage zone of a satellite beam does not necessarily guarantee a good channel quality when accessing said satellite beam). As a consequence, by being provided with the reference points of potential target satellite beams or cells as well as with distance thresholds for each satellite beams, a user equipment may determine whether it is within a zone where an access with satisfying conditions through a given target satellite beam is possible, by computing the distance between its own location and the location of the reference point of a given target satellite beam and determining whether this computed distance is below the distance threshold of said target satellite beam or not. The computation of such a distance by the user equipment makes sense because the user equipment is able to obtain data of its current position on the Earth surface. Indeed, user equipment are classically equipped with a GNSS which allow them to know their own location of the Earth surface. The values of the distance thresholds defined for each satellite beam are managed and negotiated by the base stations corresponding to each of the satellite beams. Such negotiations can take the different characteristics of the satellite beams into account so that the distance thresholds defined by the base stations can serve as a resource control. For example, if a given first satellite beam delimitates a very restrictive zone of access for user equipment (that is, the distance threshold of the given first satellite beam is very short), a second satellite beam which will overlap said first satellite beam according to the satellite constellation dynamic will possibly delimitate a larger zone of access for user equipment through a longer distance threshold in order to balance the access control of user equipment. Different thresholds can be set within a same beam, and the UE can pick which one to use depending on its location, for example the UE can use different thresholds when moving towards/away from the beam center or the reference point. For example, a larger threshold can be used when the UE detects based on e.g. its GNSS that it moves towards the reference point, since it would move into the cell coverage and expect improving connection conditions. A shorter range can be used when the UE detects e.g. based on its GNSS that it is moving away from the reference point, since it would progressively move out of the current beam coverage and accessing the next cell would ensure a longer dwelling time in the next cell.

In one embodiment, the assistance information provided at step S13 may also include other types of thresholds defined for each satellite beam other than distance thresholds. Such other thresholds can be set per channel quality measurement, per service or per degree of priority of said service. As in the precedent example, different thresholds can be set within a same beam, and the UE can pick which one to use depending on its location, for example the UE can use different thresholds when moving towards/away from the beam center or the reference point. For example, a first satellite beam can define a threshold for the degree of priority of each of the services carried by user equipment and allow access procedure requests from user equipment when said degree of priority is beyond said threshold. Such thresholds can be discussed through inter-base stations interactions, so that each user equipment is able to access to at least one satellite beam based on the degree of priority of the services it carries. Such thresholds can be set momentarily or be updated in a dynamic manner.

Providing such thresholds (like distance thresholds or service thresholds for example) for target satellite beams to the user equipment through the assistance information allows the user equipment to anticipate the connection conditions with each of the corresponding satellite beam.

The content of the assistance information as described above is transmitted to the user equipment by the base station the user is synchronized to at step S13 through at least one of its satellite beams (that is, the one whose surface zone currently covers the location of the user equipment). Such assistance information can concern said base station the user is synchronized to (and thus its corresponding cell and the satellite beam transmitting said information) and/or different base stations (and thus the corresponding cells and satellite beams managed by said base stations). When said assistance information concerns a quantitative value, it can be given as a full or a differential value like a difference with respect to the synchronized base station for instance.

At step S14, the user equipment proceeds to gather information on its side to complete the assistance information provided in the context of the present description at step S13. In order to do so, the user equipment performs classic measurements with one or several satellite beams at step S14. Such classical measurements consist for instance in signal to noise ratio (SNR), reference signal received power (RSRP) or any other known channel quality measurements which allow the user equipment to evaluate the instantaneous connection conditions with the measured satellite beam. The scope of such measurements is reduced since such values are to be different at a different moment.

Based on the interpretation of information from the channel quality measurements received at step S14 and the assistance information received at step S13, the user equipment is able to compare the current connection conditions through several satellite beams as well as to anticipate such connection conditions in a near future on the basis of the assistance information received at step S13.

The interpretation of such information leads the user equipment to select a target satellite beam at step S15, through which it will access the satellite communication network. The selection of said target satellite beam relies on the comparison and anticipation of the different connection conditions of each potential target satellite beams and the user equipment a priori selects the target satellite beam with the best connection conditions on the long run. Said selected satellite beam can be a satellite beam managed by the base station with which the user equipment established a downlink synchronization at a previous step S12 (that is, the satellite beam through which the assistance information was transmitted from the base station or another satellite beam of said base station) or a satellite beam managed by a different base station and that the user equipment received information about through the assistance information at step S13. The user equipment can also select a target satellite beam different from the one suggested by the assistance information as the best target satellite beam (that is, the target satellite beam with the best connection conditions on the long run), the assistance information only serving as a guidance for the user equipment to make its own selection. Such a selection should use the guidance provided by the user equipment but should also consider the priorities of said user equipment in terms of quality of the access but also time before the access etc.

At step S16, the user equipment determines whether an immediate access to the satellite network through the target satellite beam selected at step S15 is to be performed or if a temporization is to be established before requesting an access to said target satellite beam. When the target satellite beam is available (that is, its beam footprint currently covers the location of the user equipment on the Earth surface or the beam is not too loaded), the user equipment can perform a random-access procedure request through said target satellite beam and immediately access the satellite communication network without any temporization at step S161. On the contrary, some cases require a temporization. Such non-exhaustive cases concerning the positions of the beams are exposed below.

A first case in which such a temporization is needed is when the selected target cell is not accessible to the user equipment at a current time because a near-future change of coverage or beam leap has not happened yet. That is, the user equipment may be out of the coverage zone of the cell supporting said target satellite beam or the current beam footprint of said target satellite beam on Earth surface does not include the location of the user equipment at a current time. In such a case, an immediate access is impossible physically speaking. A second case in which a temporization may be needed is when the user equipment is under the coverage of the cell supporting said target satellite beam and the current beam footprint of said target satellite beam on Earth surface strictly includes the location of the user equipment at a current time but the user equipment does not meet the conditions of access defined by said target satellite beam (in terms of thresholds for instance) at the current time. For instance, the distance between the location of the user equipment and a reference point of said target satellite beam may be above the distance threshold of said target satellite beam at the current time. The user equipment thus has to establish a temporization and wait for the beam footprint of said target satellite beam to move closer to its location on the Earth surface, so that the distance threshold of said target satellite beam is met. In that case, an immediate access to the satellite network through said target satellite beam is physically possible (since the user equipment is under the coverage of the corresponding cell and the corresponding beam footprint includes the location of the user equipment) but a temporization is preferred in order to contribute to the balance of the resource management of the satellite network or/and to ensure better connection conditions for the user equipment. In such cases, the user equipment will access the satellite network by performing a random-access procedure request to the target satellite beam after establishing a temporization at step S162. A temporization can be established in other cases, the precedent cases being described in a not limitative way.

However, the establishment of a temporization, despite being needed or preferable, is not always possible for a user equipment. Indeed, in the case when a user equipment carries a brief emergency service for instance, neither a sustainably good channel quality nor a balance of the performance of the satellite network are priorities for the user equipment, which aims at transmitting an emergency data packet to the satellite network as soon as possible. In that case, the user equipment will not establish a temporization on the basis of its degree of priority and will immediately perform a random-access procedure request towards the selected target satellite beam at step S161.

Figure 4:
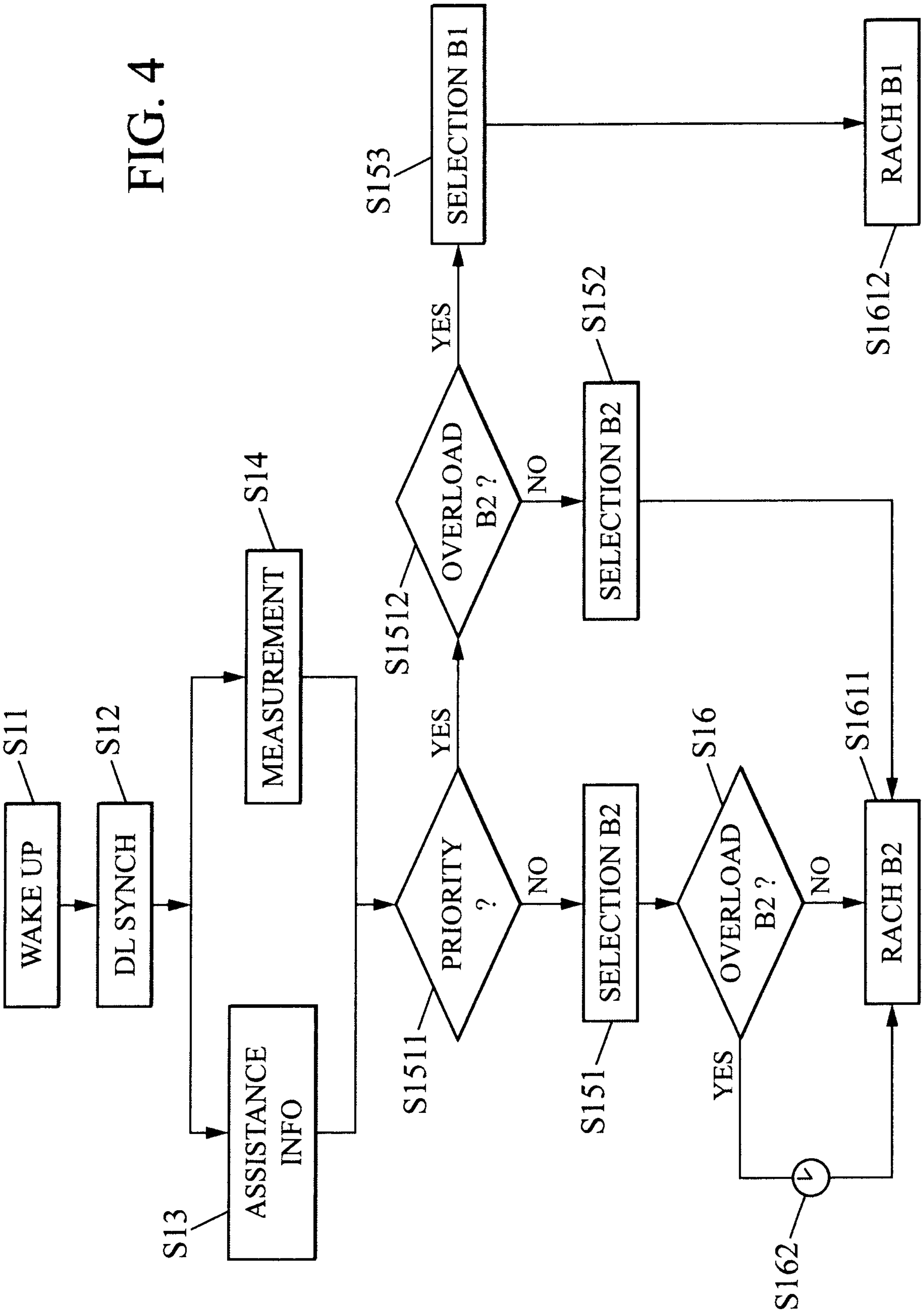
FIG. 4 is a flowchart showing steps implemented by a user equipment according to a possible embodiment of the invention.

It is now referred to FIG. 4. FIG. 4 represents a flowchart of a method implemented by a user equipment located on the Earth surface in order to perform an initial random-access procedure (RACH) request towards a satellite beam of the satellite communication network, in order to access said satellite network. FIG. 4 details a particular use case of the general implementation described in FIG. 3.

After exiting idle mode at step S11, the user equipment establishes an initial process of identifying any accessible base station to set a downlink synchronization at step S12. It is considered here that the user equipment sets a downlink synchronization with only one base station. Referring to FIG. 2, the user equipment (UE1) synchronized with base station BS1 defining cell C1 and managing beams B1 and B2. In another embodiment, the user equipment may perform a downlink synchronization with several base stations if it is simultaneously under the coverage zones of the corresponding cells. At steps S13 and S14, the user equipment (considered here to be UE1) gathers information both from the network through the assistance information received at step S13 and from measurements with each of the potential satellite beams (B1, B2) at step S14, said information and gathering being detailed in the description of FIG. 2 and FIG. 3. At this point, the user equipment (UE1) compares the present and future connection conditions between satellite beams B1 and B2. Thanks to the measurements of channel quality indicators made by the user equipment (UE1) with each satellite beam (B1, B2) and assistance information sent by base station BS1 about each satellite beam (B1, B2), the user equipment (UE1) finds that present connection conditions are better through satellite beam B1. However, the assistance information transmitting an upcoming beam leap between satellite beams B1 and B2 in a predictable time, the user equipment (UE1) knows that the connection conditions of satellite beam B1 will deteriorate as the connection conditions of satellite beam B2 will get better due to the predictable movements of satellite beam footprints on the Earth surface.

At step S1511, the user equipment (UE1) considers the types of service for which it is used and the degree of priority of these types of service. Said degree of priority is stored within the memory unit of the user equipment (UE1) and defines its need to access the satellite network immediately or not. Depending of said degree of priority to immediately access the network, two different cases can occur.

In case the user equipment (UE1) does not carry an emergency service or has a low degree of priority (low being defined here as below a priority threshold defined and stored by the user equipment), the user equipment (UE1) proceeds to directly select, at step S151, the satellite beam towards which the connection conditions will be the best on the long run based on the assistance information, that is, satellite beam B2 here. The user equipment (UE1) then proceeds to the same step S16 as the one illustrated on FIG. 3, that is evaluating whether an immediate access to the selected satellite beam (B2) is possible or preferable for an optimization of both the connection conditions and the balance of the network. In particular, if satellite beam B2 encounters an overload (that is, the number of user equipment requesting an access to the network through said satellite beam B2 is superior to the maximum number of access requests supported by satellite beam B2), then the user equipment (UE2) proceeds to a temporization at step S162 in order to wait for the selected satellite beam (B2) to be available. In another embodiment, the user equipment (UE1) can perform a temporization at step S162 if the selected satellite beam (B2) is not accessible for other reasons than an access overload (if the current position of the beam has not yet reached the location of the user equipment for instance). After an optional step S162 of temporization, the user equipment (UE1) eventually performs the random-access procedure request (RACH) through the selected satellite beam (B2). One can particularly notice that the selection of the target satellite beam at step S151 to access the network does not rely on the constraints of temporization to access said beam.

In case the user equipment (UE1) carries an emergency message and needs an immediate access to the satellite network, the possible constraints of temporization conditions the selection of the satellite beam may be lifted. Indeed, the user equipment will first consider the current state of the satellite beam suggested by the assistance information and the possibility to immediately access said beam before selecting it for the access. Indeed, the user equipment (UE1) will select the satellite beam towards which a random-access procedure request (RACH) can be made without temporization, even if said beam does not present the best connection conditions for the user equipment on the long run. As a consequence, if the user equipment (UE1) evaluates at step S1512 that the satellite beam suggested by the assistance information, that is satellite beam B2, is overloaded (or is not immediately accessible/available for any other reason), said satellite beam will not be selected and the user equipment (UE1) will select satellite beam B1 at step S153 and access the network through said beam at step S1612. If the satellite beam (B2) suggested by the assistance information is immediately available, then said satellite beam (B2) is selected at step S152 and the user equipment accesses the network through said beam B2 at step S1611.

Figure 5:
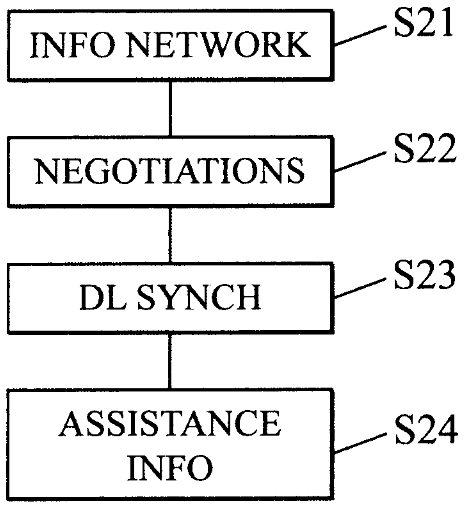
FIG. 5 is a flowchart showing steps implemented by the satellite network to manage the assistance for RACH procedures according to a possible embodiment of the invention.

It is now referred to FIG. 5. FIG. 5 represents a flowchart of steps implemented by the satellite network to manage the assistance to random access procedure by user equipment according to the present description.

At step S21, all base stations (or any other network entity except a user equipment) of the satellite communication network are configured to store information about the satellite network. Said information about the satellite network includes for example:

- ephemeris of the satellite constellation which gives the satellite constellation dynamic; and/or
- the beam topology, that is, the distribution of beam footprints of satellite beams on the Earth surface; and/or
- the successive movements and positions of the cells on the Earth surface; and/or
- any other information relative the satellite network topology.

Such information is predictable (both in its nature and its timing) through the configuration of the satellite network and can be stored on the memory unit of each base station of the satellite network. Moreover, base stations can also receive or compute information about each satellite beam in order to know and anticipate the transmission and physical characteristics of each satellite beams. As a consequence, a given base station of the satellite network is able to compute (and thus transmit to user equipment) information concerning its own satellite beams (that is, the satellite beams managed by said base station) but also concerning satellite beams managed by other base stations of the satellite network.

At step S22, negotiations are established by the different base stations through inter-base station interactions. Such negotiations between base stations aim at defining specific zones, thresholds for each satellite beam (or for cells) managed by each base station, such zones and thresholds helping base stations manage an access control to the different beams by user equipment.

Indeed, network access control is particularly complex in the case of a satellite network since the numerous quantities of deployed user equipment is high and their traffic is subject to burst. Depending on various parameters-like the antenna pattern at a given user equipment side and satellite positions, user equipment can create time variant interference onto neighboring satellite cells. Moreover, user equipment has poor beamforming and tracking capability. An access management with negotiated thresholds thus enables the base stations to distribute the access requests to different satellite beams and avoid overloads.

Negotiations are particularly relevant between base stations whose cells or satellite beams will encounter direct overlaps and such negotiations may determine the adapted base station to receive the access of a user equipment with a given location on the Earth surface. Negotiated thresholds can define for each satellite beam a geographical area included in said beam footprint within which user equipment can access the satellite network through said satellite beam with satisfying and lasting connection conditions. That is, negotiations can lead to satellite beams of base stations having a distance threshold with respect to each of their center (or any other reference point associated with one satellite beam) which defines a restrictive area of connection in the beam footprint of said satellite beam. Negotiated thresholds can also correspond to channel quality thresholds such as signal to noise (SNR) or reference signal received power (RSRP) thresholds. That is, user equipment which has a value of channel quality indicators below channel quality thresholds of a given satellite beam will not be able to access the satellite network through said satellite beam. Other kind of thresholds can be applied for nature of services carried by user equipment, degrees of priority etc.

Negotiations between different base stations can be made in a dynamic way. That is, values of thresholds can change depending on the characteristics of each satellite beam, like their respective access capacity, level of interference, noise factor etc. and base stations can negotiate values taking such measures into account.

At step S23, a given base station (referred in the description of this FIG. 5 as the main base station) receives signaling from a user equipment on the Earth surface to set a downlink synchronization. Said main base station defines a cell, that is a coverage zone, on the Earth surface and manages one or several satellite beams, whose beam footprints form the cell. For the downlink synchronization to be established, said user equipment necessarily belongs to the coverage zone of the main base station and thus belongs to at least one of the beam footprints of its satellite beams. The downlink synchronization enables the main base station to transmit data to the user equipment with radiofrequency signals transmitted through the communication interface of the main base station, the (at least one) satellite beam and received by the communication interface of the user equipment. The user equipment can establish other downlink synchronizations with other base stations, but for the simplicity of the description of this Figure, only the downlink synchronization between the user equipment and the main base station will be considered.

At step S24, the main base station can transmit data of assistance that the user equipment is able of decoding. Said data of assistance information relies on the information received or computed from the satellite network at step S21 and stored on the memory unit of the main base station. Said data of assistance information can also come from the dynamic negotiations made with other base stations. The assistance information can thus be about the main base station or other base stations.

The content of the assistance information depends on the satellite beam through which the base station transmits said content. The location of the user equipment being unknown by the base station (the satellite network has no information on the user equipment and the location of such user equipment on the Earth surface before said user equipment connects to the satellite network), the assistance information is personalized to the satellite beam whose footprint covers the location of the user equipment, that is, all user equipment included in the beam footprint of a given satellite beam receives the same assistance information from said beam. Several beams of the same cell can also disseminate the same assistance information. As a consequence, the base station will transmit data of assistance information stored on its memory unit, based on the identity of the beam footprint including the location of the user equipment and thus on the satellite beam through which the assistance information is transmitted. Such assistance information relates to the changes of coverage that will occur in the current surface zone of said beam within a limited amount of time and characteristics of the satellite beams at play in such current surface zone (that is satellites beams that currently/will soon cover said surface zone). The content of said assistance information is detailed in the description of FIG. 3.

The invention claimed is:

1. A method implemented by a user equipment to access a satellite network, at least one satellite of said satellite network being in movement relatively to Earth, said satellite network deploying radiofrequency satellite beams, the method comprising:

(a) receiving through at least a first satellite beam data of assistance information regarding at least current and future satellite beams of the network, (b) interpreting said data of assistance information to anticipate:

connection conditions through said first satellite beam, and the connection conditions through at least one second satellite beam, different from said first satellite beam, (c) deciding the access to the satellite network through a satellite beam among the first satellite beam and the second satellite beam, selected on the basis of at least said connection conditions through said first and second satellite beams, and (d) implementing a random access channel (RACH) procedure through the selected satellite beam, wherein the method further comprises:

determining whether the connection conditions to the selected satellite beam is to be established after a temporization determined from said data of assistance information, wherein the temporization corresponds to a delay that is applied in a first case where the user equipment is out of coverage of a cell that supports the selected satellite beam such that immediate access to the selected satellite beam is not possible at a current time, and a second case where the user equipment does not satisfy conditions of access for the selected satellite beam, and applying said temporization as the delay before accessing the satellite network through the selected satellite beam.

2. The method according to claim 1 further comprising:

determining on the basis of said data of assistance information whether the connection conditions with said second satellite beam will be better, at a time before a duration threshold, than the connection conditions with said first satellite beam and selecting then the second satellite beam to access the satellite network.

3. The method according to claim 1 further comprising:

determining, from said data of assistance information, current and future successive positions of surface zones of said first and second satellite beams, and applying a temporization before accessing the satellite network through the selected satellite beam as long as a current location of the user equipment is outside the surface zone of the selected satellite beam.

4. The method according to claim 3, the user equipment occupying a current location and being able to obtain data of said current location, wherein said data of assistance information includes at least data of current and future positions of reference points associated to respective satellite beams and distance thresholds data defined for each of the satellite beams, said distance threshold being a maximum allowed distance between a location of a user equipment and a current position of a reference point associated to a satellite beam, the method further comprising:

determining distances respectively between the location of the user equipment and the current position of the reference point associated to the satellite beam, comparing said determined distances respectively to said distance thresholds for each satellite beam, and applying the temporization before accessing the satellite network through the selected satellite beam as long as the distance between the location of the user equipment and the current position of the reference point associated to the selected satellite beam exceeds the distance threshold of the selected satellite beam.

5. The method according to claim 3, further comprising:

determining, upon a temporal information included in said data of assistance information, a duration until when the surface zone of the selected satellite beam will include the current location of the user equipment, and applying the temporization corresponding to said determined duration.

6. The method according to claim 1 further comprising:

obtaining data related to the current location of the user equipment, and when the current location of the user equipment is determined to be covered by both the respective surface zones of the first and second satellite beams, selecting, on the basis of respective future connection conditions with said first and second satellite beams, the beam among the first and second satellite beams to access the satellite network.

7. The method according to claim 1 further comprising: storing a data related to a degree of priority to access the satellite network, and wherein the application of said temporization depends on said data of degree of priority.

8. The method according to claim 7, the user equipment being able to be used for a plurality of types of service, and wherein the method further comprises:

storing data related to degrees of priority to access the satellite network for each of said types of service, and wherein the application of said temporization depends on the data related to the degree of priority of a type of service for which the user equipment is currently intended to be used.

9. The method according to claim 1, said data of assistance information including information about access capacity levels due to satellite beam loads of the satellite beams, and wherein the method further comprises:

comparing access capacity levels of the respective satellite beams, and when the access capacity level of the first satellite beam is below the access capacity level of the second satellite beam, selecting the second satellite beam to access the satellite network.

10. The method according to claim 1, said data of assistance information received by the user equipment including at least channel quality thresholds for each of the satellite beams, wherein the method further comprises:

making measurements of channel quality indicators with respective satellite beams before accessing the satellite network, comparing said measurements to each of said channel quality thresholds so as to identify at least one satellite beam for which the channel quality indicator is above the channel quality threshold, the identified satellite beam being thus a candidate for the selection of satellite beam through which the user equipment accesses the satellite network.

11. The method according to claim 1, the data of assistance information comprising at least one element among a set of elements comprising:

a level of interference between at least two satellite beams among the satellite beams, a noise factor of each of the satellite beams, a transmit power of each of the satellite beams, wherein the method further comprises determining the connection conditions with the satellite beams based on at least one of said elements or on a combination of said elements.

12. The method according to claim 1, wherein said data of assistance information is received through at least said first satellite beam during or after an initial downlink synchronization between said first satellite beam and said user equipment, before the RACH procedure.

13. A non-transitory computer readable medium comprising program instruction code stored for the execution of a method by the user equipment, the method for accessing a satellite network, at least one satellite of said satellite network being in movement relatively to Earth, said satellite network deploying radiofrequency satellite beams, the method comprising:

(a) receiving through at least a first satellite beam data of assistance information regarding at least current and future satellite beams of the network, (b) interpreting said data of assistance information to anticipate:

connection conditions through said first satellite beam, and the connection conditions through at least one second satellite beam, different from said first satellite beam, (c) deciding the access to the satellite network through a satellite beam among the first satellite beam and the second satellite beam, selected on the basis of at least said connection conditions through said first and second satellite beams, and (d) implementing a random access channel (RACH) procedure through the selected satellite beam, wherein the method further comprises:

determining whether the connection conditions to the selected satellite beam is to be established after a temporization determined from said data of assistance information, wherein the temporization corresponds to a delay that is applied in a first case where the user equipment is out of coverage of a cell that supports the selected satellite beam such that immediate access to the selected satellite beam is not possible at a current time, and a second case where the user equipment does not satisfy conditions of access for the selected satellite beam, and applying said temporization as the delay before accessing the satellite network through the selected satellite beam.

14. A user equipment comprising a processing circuit to perform a method for accessing a satellite network, at least one satellite of said satellite network being in movement relatively to Earth, said satellite network deploying radiofrequency satellite beams, the method comprising:

(a) receiving through at least a first satellite beam data of assistance information regarding at least current and future satellite beams of the network, (b) interpreting said data of assistance information to anticipate:

connection conditions through said first satellite beam, and the connection conditions through at least one second satellite beam, different from said first satellite beam, (c) deciding the access to the satellite network through a satellite beam among the first satellite beam and the second satellite beam, selected on the basis of at least said connection conditions through said first and second satellite beams, and (d) implementing a random access channel (RACH) procedure through the selected satellite beam, wherein the method further comprises:

determining whether the connection conditions to the selected satellite beam is to be established after a temporization determined from said data of assistance information, wherein the temporization corresponds to a delay that is applied in a first case where the user equipment is out of coverage of a cell that supports the selected satellite beam such that immediate access to the selected satellite beam is not possible at a current time, and a second case where the user equipment does not satisfy conditions of access for the selected satellite beam, and applying said temporization as the delay before accessing the satellite network through the selected satellite beam.

* * * * *